April 18, 1950     H. M. KILPATRICK     2,504,535
CHECK CONTROLLED AND DISPENSING TURNSTILE Original Filed March 10, 1938

INVENTOR
H. M. Kilpatrick

Patented Apr. 18, 1950

2,504,535

UNITED STATES PATENT OFFICE 2,504,535

CHECK CONTROLLED AND DISPENSING TURNSTILE

Howard M. Kilpatrick, New York, N. Y.

Original application March 10, 1938, Serial No. 195,188. Divided and this application February 5, 1943, Serial No. 474,821

26 Claims. (Cl. 39—3)

This invention relates to turnstile-controlled dispensing machines and devices, and relates more particularly to modifications of the invention embodied in the machine for dispensing cardboard checks and other articles shown in my United States Patent No. 2,204,897, issued June 18, 1940, and my copending application Serial No. 195,188, filed March 10, 1938, resulting in Patent No. 2,312,340, issued March 2, 1943.

The present application shows species of the invention disclosed in said application No. 195,188 and includes claims divided from such application.

Many restaurants are provided with check dispensing machines placed near the entrance of the restaurant; but during rush hours, an attendant is usually stationed at the machine to hand the checks to the incoming customers and to prevent any customer from entering without receiving a check. An object of the present invention and the machine of said patent and this application is to eliminate the need of this attendant. Other objects also will appear.

To this end said patents and the present application show machines which project each check to a position where it may be taken away by the customer, each machine being provided with a turnstile, revolving door or other barrier which prevents the customer from entering until he has taken the check. As the customer passes through the turnstile, the machine presents another check and leaves the turnstile in position for the next customer, holding the turnstile locked until said next customer takes away the newly presented check. In said second named patent are shown other ways of performing the function of said machine.

Said barrier or turnstile, when locked serves as a signal or reminding means to remind the customer that he has not taken the required check; and other objects of the present invention are to provide improved assemblies of an operatively electrically connected turnstile and these dispensing machines so connected that when the customer takes a check and enters the turnstile a new check will not be presented until the customer has passed completely through the turnstile.

While the description herein relates to checks and customer operated devices, it is understood that the invention, as claimed in the broader claims, is not limited to these, and that the device may be greatly varied in many respects without departing from the scope of the invention as defined in the broader claims.

Figure 1:
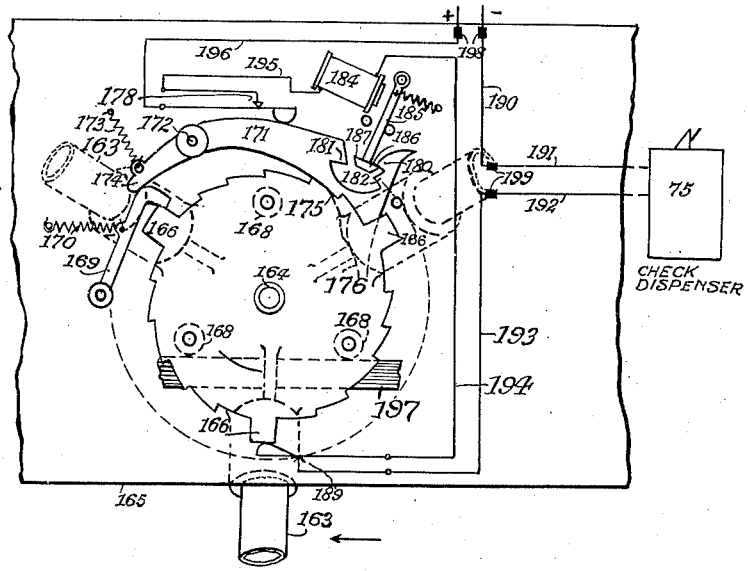
Figure 1:
Figure 2:
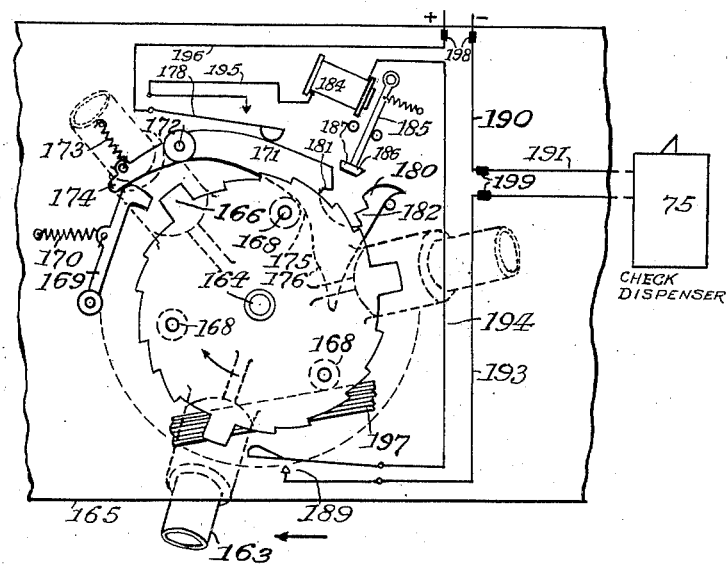
Figure 2:
Figure 3:
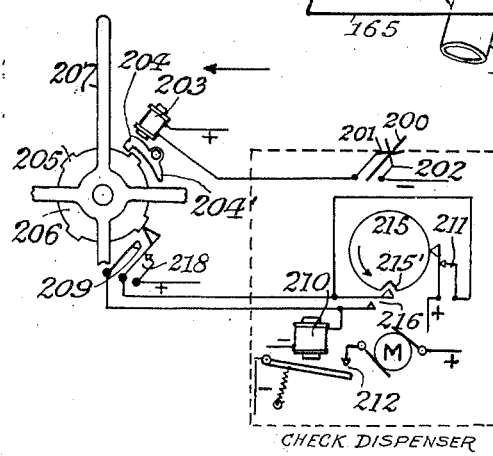

In the accompanying drawings, Figs. 1 and 2 are fragmental diagrammatic plans showing different positions of one form of the invention, and Fig. 3 shows diagrammatically another form of turnstile mechanism in plan and an associated check dispensing mechanism in elevation.

In the form of the invention of Figs. 1 and 2 is shown a turnstile in combination with a check dispenser 75 of the type of the Sullivan patent, No. 1,293,974, adapted, when a check is removed therefrom, to allow the transmission of current therethrough until a new check is presented for removal. The turnstile may be similar to that of the Kennedy Patent No. 1,841,132, issued January 12, 1932, and has arms 163 and a disk 164 rotary and fast therewith, on a support 165, the disk being provided with a lug 166 and a roller 168 for each arm 163.

A latch 169 is normally engaged with a lug 166 to prevent forward movement of the turnstile and is biased by a spring 170 to release the lug, when the latch is released by an escapement lever 171 pivoted at 172 and having a released position (Fig. 2), a first position (most remote from the disk), an intermediate position adjacent to the first position and a normal position (Fig. 1) between the intermediate and released position, as will be explained.

A spring 173 at times yieldably moves the lever from the first position through the other positions to the released position; and an extension 174 carried by the lever holds the latch 169 in the path of the lugs during all of said positions except the released positions.

Said lever has a cam edge 175, 176 normally disengaged by any roller 168, the part 175 being adapted to be engaged by a roller as the turnstile moves from one position to the next to move the lever quickly from released to normal position to close the switch 178, the roller then engaging the part 176 and slowly moving the lever to the first position as the turnstile completes its operation. The lever 171 is provided with escapement teeth 180, 181, 182.

An electro-magnet 184 has a yieldably retracted pivoted armature 185 carrying projections 186, 187 adapted to engage said teeth, the projection 186 being adapted when the armature is attracted to disengage the tooth 182 and release the lever from the first to the intermediate position, where the projection 187 catches on the tooth 181. When the armature is again retracted the projection 186 engages the tooth 180 to hold the lever in normal position. When the armature is again retracted, the projection 186 is disengaged from tooth 180 to release the lever from normal to released position.

The lever operated switch 178 is biased to open position and is closed by the lever except when the lever is released. A lug operated switch 189 is biased to open position and is closed by a lug 166 when the lug is in normal position.

Conductors 190, 191, 192, 193, 194, 195, 196 connect said dispenser 75, switches 178, 189 and the magnet 184 in series; and when the parts are all in the normal position of Fig. 1, removal of a check from the dispenser connects conductors 191, 192 and allows current flow, momentary energization of the magnet 184 and immediate release of the lever 171 and latch 169, thus immediately opening the lever operated switch 178 and the circuit before the check dispenser can present and cut off a new check. The customer can now pass through the turnstile in the direction of the lower arrow. Partial movement of the turnstile to an intermediate position opens the other switch 189 (Fig. 2) and has no effect on the already deenergized magnet 184; but complete operation of the turnstile closes the lug-operated switch 189 and causes a roller to engage the cam edge 175, 176, thus restoring the lever to first position with projection 186 caught on tooth 182 at the same time closing the lever operated switch 178 thereby completing the circuit, energizing the magnet, withdrawing the projection 186 from tooth 182 and catching projection 187 on tooth 181 to hold the lever in intermediate position while the current operates the dispenser 75 until the next check is presented and cut off and the circuit broken in and by the dispenser, whereupon the magnet becomes deenergized, and the projection 187 moves from tooth 181, and projection 186 catches on tooth 180 holding the lever in normal position, leaving the combination, with the turnstile locked, in the position of Fig. 1, ready for the next customer. The turnstile is yieldably held in normal position by the positioning bar lever 197 as in the Kennedy patent.

It is noted that with the arrangement of Figs. 1 and 2, the novel mechanism is all in the turnstile, and in order to connect it for operation, it is only necessary to connect the conductors 190, 196 of the turnstile to the source of the current 198, and then connect the dispenser conductors 191, 192 to the turnstile at the socket 199.

In the form of the invention as shown in Fig. 3, the parts 201, 202 and M, and the check feed and cut off means may be similar to that of said Sullivan Patent No. 1,293,974. The disk 215 in the position shown could be mounted on the member D of the Sullivan patent, when in normal position, to rotate therewith.

In this form of the device, the customer enters in the direction of the arrow, taking a check 200, closing contact 201, 202, energizing magnet 203 and releasing latch 204 from a lug 205 on the disk 206 fast on the turnstile 207. One customer may now pass, but two customers may not pass, as the tail 204' will stop the next lug 205.

When the customer has moved the turnstile a few degrees, contact is made at 209, whereupon current may pass from minus through relay magnet 210, contacts 209 and 211 to plus, energizing the relay magnet 210 and closing the motor circuit through contact 212 and the motor. The motor then operates and feeds and cuts off a new check at 200 and rotates the disk 215, which is rotatably connected to the motor operated check feed and cut off means. The disk 215 rotates once for each check feed and cut off.

After feeding starts the disk 215 closes contact 216; and the new check 200 breaks the contact of 201, 202, allowing the latch 204 to be restored to normal, allowing the turnstile to quickly complete its normal quarter turn. The completion of the turnstile operation breaks the contact at 209, but the current passes at 216 and 211 or 218 until the check has been cut off and the disk 215 makes a complete cycle, opening the switch 216, thus cutting off all current through relay magnet 210 and therefore through the motor M. The turnstile is now ready for the next customer.

If the customer should stop the turnstile halfway, contact 218 would remain open until the cam notch 215' reached and opened contact 211, thus stopping the motor and cam before the check was cut off. Thus two checks cannot be taken before the turnstile completes. After the device has been thus stopped, the customer may complete the turnstile movement, whereupon current will pass from minus through magnet 210 and contact 218 to plus, and the cycle will be completed.

From the above, it will be noted, that the stile cannot be moved until a check is taken; the motor will not start until a check is taken and the stile pushed; the stile can complete only a quarter turn for each check; only one check can be cut off and taken until the quarter turn is completed.

It is understood that the work "check" as used in the claims herein is not limited to restaurant checks, but covers tickets and other articles which may be presented by presenting or dispensing means.

The springs 170 and 173 constitute means for urging the latch 169 and lever 171 respectively.

When the check is removed from the dispenser 75, the circuit is completed between conductors 191, 192 and the magnet 184 is energized releasing the lever 171 (Fig. 1) and the latch 169. Therefore parts 190, 191, 193, 189, 194, 184, 185, 171, 173, 174, 170 constitute a latch control device or means set in operation by, the removal of a check for unlatching the latch. Parts 201, 202, 203, 204 of Fig. 3 constitute latch control means. Switch 189 (Fig. 1) or switch 211 (Fig. 3) constitute means for holding open the circuit for preventing operation of the dispenser when the turnstile is partially turned and until the turnstile is turned to normal position. The drive means for the dispenser of Fig. 1 is the motor of the Sullivan patent or the drive means for the dispenser of Fig. 3 is the motor M and the parts connected to the check feed as in the Sullivan patent.

The dispenser 75 and parts 190, 191, 192, 193, 189, 194, 178, 196 (Fig. 1) and parts 209, 210, 212, 211, 215, 216 (Fig. 3) constitute power starting means for initially completing the circuit through the drive means and applying power for starting the dispenser. The switch 189 and lug 166 (Fig. 1) and parts 209, 210, 212, M, 215, 216, 211 constitute means including the switch (189 or 211) interposed in the circuit and closed by the turnstile when in normal position and opened by the turnstile when only partly turned for stopping the dispenser until the turnstile is turned to normal position.

The lugs 166 (Fig. 1) and cam 215 and notch 215' (Fig. 3) constitute means to engage switch 189 or 211 part of the power means, to disable the power means.

Mechanism in the Sullivan dispenser 75 (Fig. 1) and parts 209, 210, 212, M (Fig. 3) constitute means for initially starting the dispenser. Parts 209, 210, 212, and M (Fig. 3) constitute means controlled by the turnstile when initially turned for initially starting the dispenser.

The parts 191, 75, 192, 193, 189, 166, 184, 185, 175, 171, 178, 195 and 196 (Fig. 1) and parts 218, 216, 215, 210, M, the check feed parts 201, 202, 203 and 204 (Fig. 3) constitute means operated by the complete operation of the turnstile.

The spring 173 constitutes means for biasing the lever 171 to released position. The roller 168 constitutes means for moving the lever from released position to said first position. The magnet 184 and parts 185, 186, 187, 180, 181, 182 constitute electric means to release the lever from first to normal position, or from normal to released position. Said means for initially starting the dispenser and said means operated by the complete operation of the turnstile together constitute drive control means for causing the drive means to partially feed and for restarting the operation of the dispenser and completing the feeding when the turnstile is advanced to normal position.

Parts 190 (Fig. 1), 191, 75, 192, 193, 189, 194, 184, 85, 171, 168, 195, 196, 198, 164, 168 and 173 constitute means for operating the switch 178. Parts 164, 166 and 189 constitute means for operating the switch 189 (Fig. 1). Parts 206, 205, 209, 218 (Fig. 3) constitute means for operating the switch 209, 218. Parts M, 215, 215', 211 constitute means for operating the switch 211.

The lever 171 is means engaged by the turnstile to cause the lever to engage the switch 178 (part of the power means) when the turnstile is turned to normal position to cause the power means to restart.

The lug 205 (Fig. 3) engages the contact 218 (part of the power means), to restart the dispenser.

The lug 166 (Fig. 1) or lug 205 (Fig. 3) constitutes a device to engage and open the switch 189 (Fig. 2) or 209 (Fig. 3) to hold the circuit broken.

The invention claimed is:

1. In combination, a turnstile having a latch; a check dispenser; latch control means set in operation by the removal of a check for unlatching the latch; drive means for the dispenser including an electric circuit and adapted, when the circuit is complete, to drive the dispenser until a check is presented for removal and then to break the circuit; and means controlled by the turnstile when in partially turned position to hold open said circuit.

2. In combination a turnstile having normal closed positions; a check dispenser adapted to project a check into position for removal of the check; drive means for the dispenser including an electric circuit adapted when complete to cause the drive means to drive the dispenser until a new check is presented for removal and then to break the circuit; means for initially completing said circuit; means including a switch interposed in said circuit and closed by the turnstile when in normal positions and opened by the turnstile when only partly turned to prevent the dispenser from presenting a check for removal until the turnstile is completely moved to normal position.

3. In combination, a turnstile having closed normal positions; a check dispenser adapted when started to present a check to a position for removal and then to automatically stop; a starting means for initially starting the dispenser; and means controlled by the turnstile when only partially turned for stopping the dispenser until the turnstile is turned to normal position.

4. In a combination, as in claim 3, said starting means being controlled by the removal of a check for initially starting the dispenser.

5. In a combination, as in claim 3, means controlled by the turnstile when initially turned to initially start the dispenser.

6. In combination, a turnstile having a closed normal position and a latch for holding the turnstile in said position; a check dispenser having check holding means adapted to project a check into a position for removal of the check; a latch control means associated with the check and latch for unlatching the latch to allow a passage of a person; drive means for the dispenser including an electric circuit adapted when complete to cause the drive means to drive the dispenser until a new check is presented for removal and then to break the circuit; means for initially completing said circuit; a switch in the turnstile interposed in said circuit and controlled by the turnstile to close said switch when the turnstile is in normal position and open the said switch when the turnstile is partially turned, thereby to prevent the drive means from presenting a check for removal until the turnstile is completely turned to closed position.

7. In combination, an electric circuit; a check dispenser interposed in the circuit and adapted, when a check is removed from the dispenser, to transmit current of the circuit through the dispenser until a new check is presented for removal; a turnstile; a normally closed latch for the turnstile; means controlled by the turnstile and the circuit, whereby when the turnstile is in normal position, removal of a check causes momentary current flow and release of the latch; means operated by the turnstile when in intermediate position to hold open said circuit; means operated by complete operation of the turnstile for again closing the circuit and latch, thereby operating the dispenser until the new check is presented and the circuit broken by the dispenser.

8. In combination, a check dispenser adapted, when a check is removed therefrom, to transmit current until a new check is presented; a turnstile; a lever having a released position, a first position, and a normal position between the other positions; means for biasing the lever toward released position; latch means operated by the lever for holding the turnstile latched except when the lever is in released position; means operated as the turnstile moves from one position to the next to move the lever from released position to the first position; an electric means adapted when energized and then deenergized to release the lever from first to normal position, or from normal to released position; a lever operated switch biased to open position and closed by the lever except when the lever is released; a turnstile operated switch biased to open position and closed by the turnstile when in normal position; and conductors connecting said dispenser, switches and electric means in series.

9. In combination; a turnstile having closed normal positions; a check dispenser adapted when completely operated to present a check to a position for removal; a starting means for initially applying power for operating the dispenser; and means set in operation by the turnstile for preventing complete operation of the dispenser when the turnstile is in partially turned position and until the turnstile is turned to normal position.

10. In a combination as in claim 9, means controlled by the turnstile for restarting the dispenser when the turnstile is turned to a normal position.

11. In combination, a turnstile having a closed normal position; a check dispenser adapted when completely operated to present a check to a position for removal; a starting means for initially applying power which if continued will start the dispenser; and means controlled by the turnstile for preventing complete operation of the dispenser when the turnstile is in only partially turned position for preventing complete operation of the dispenser until the turnstile is turned to normal position; and means controlled by the turnstile for causing the dispenser to complete its operation when the turnstile is advanced to a normal position.

12. In combination, a turnstile having a latch; a check dispenser; latch control means set in operation by the removal of a check for unlatching the latch; drive means for the dispenser including an electric circuit and adapted, as long as the circuit remains complete, to drive the dispenser until a check is presented for removal and then to break the circuit; and means controlled by the turnstile to hold said circuit broken whenever the turnstile is in partially turned position.

13. In combination, a turnstile having a latch; a check dispenser; latch control means set in operation by the removal of a check for unlatching the latch; drive means for the dispenser including an electric circuit and adapted, when the circuit remains complete, to drive the dispenser until a check is presented for removal and then to break the circuit; and means set in operation by the turnstile to hold said circuit broken whenever the turnstile remains in partially turned position.

14. In combination, a turnstile having normal closed positions; a check dispenser adapted to project a check into position for removal of the check; drive means for the dispenser including an electric circuit for the drive means adapted when the circuit remains complete to cooperate to cause the drive means to drive the dispenser until a new check is presented for removal and then to break the circuit; means for initially completing said circuit through the drive means; a switch operatively connected with the circuit and closed by the turnstile when in normal positions and opened by the turnstile when only partially turned and cooperating with the drive means to prevent current from flowing to the drive means through said switch, when thus opened, thereby to prevent the dispenser from presenting a check for removal before the turnstile is completely moved to normal position, said switch being adapted to pass current to the drive means for a period of time as soon as the turnstile has moved to normal position.

15. In combination, a turnstile having normal closed positions; a check dispenser adapted to project a check into position for removal of the check; drive means for the dispenser including an electric circuit through the drive means adapted when the circuit remains complete to cooperate to cause the drive means to drive the dispenser until a new check is presented for removal and then to break the circuit; means for initially completing said circuit; switches connected to the circuit and adapted when both are closed to complete said circuit and when both are open to break said circuit; one of said switches being closed by the turnstile when in normal positions and opened by the turnstile when only partially turned to prevent current from flowing through such switch for presenting a check for removal before the turnstile is completely moved to normal position; means cooperating with said circuit when initially completed for opening the other switch as soon as the circuit is initially completed; and means operated by the turnstile when moved from one normal position to the next for closing said other switch.

16. In combination, a turnstile; a check dispenser; a power drive means for the dispenser including conducting means forming an electric circuit and adapted, when the circuit remains complete, to drive the dispenser until a check is presented for removal and then to break the circuit; a device mounted on the turnstile, and a switch engaged and opened by said device to hold said circuit broken whenever the turnstile is in partially turned position.

17. In combination, a turnstile having a latch; a check dispenser; power drive means for the dispenser including an electric circuit and adapted, as long as the circuit remains complete, to drive the dispenser until a check is presented for removal; a switch in said circuit operated by the presented check to break the circuit; another switch in said circuit biased to open position; a device on the turnstile to engage and close said last named switch except when the turnstile is in partially turned position.

18. In combination, a turnstile having a latch; a check dispenser; power drive means for the dispenser connected to the dispenser including conducting means forming an electric circuit and adapted, when the circuit remains complete, to drive the dispenser until a check is presented for removal; means operated by the presented check to break the circuit; and a normally closed switch in said circuit, and means on the turnstile to hold said last named switch closed except when the turnstile remains in partially turned position.

19. In combination, a turnstile having normal closed positions; a check dispenser adapted to project a check into position for removal of the check; power drive means for the dispenser including an electric circuit for the drive means adapted when the circuit remains complete to cooperate to cause the drive means to drive the dispenser until a new check is presented for removal; means operated by the presented check to break the circuit; means for initially completing said circuit through the drive means; a device on the turnstile; a switch operatively connected in the circuit and closed by said device when the turnstile is in normal positions and inherently opened by the switch itself, when the turnstile is only partially turned, thereby to prevent current from flowing to the drive means through said switch, when thus opened, thereby to prevent the power means from causing the dispenser to present a check for removal before the turnstile is completely moved to normal position, said switch being adapted to pass current to the drive means as soon as the turnstile has moved to normal position.

20. In combination, a check dispenser adapted when a check is removed therefrom, to transmit current until a new check is presented; a turnstile; lugs carried thereby; a lever having a released position, a first position, and a normal position between the other positions; a spring for urging the lever toward released position; a latch operated by the lever for holding the turnstile latched except when the lever is in released position; means operated as the turnstile moves from one position to the next to move the lever from released position to the first position; an electric means adapted when energized and then deenergized to release the lever from first to normal position, or from normal to released position; and an inherently opened lever operated switch engaged and closed by said lever except when the lever is in released position; an inherently opened turnstile operated switch closed by said lugs when the turnstile is in normal position; and conductors connecting said dispenser, switches and electric means in series.

21. In combination, a check dispenser adapted when a check is removed therefrom, to present a new check and to transmit current until said new check is presented; a turnstile; an escapement lever having a released position, a first position, and a normal position between the other positions; a spring engaging the latter urging the lever toward released position; latch means engaged and operated by the lever for holding the turnstile latched except when the lever is in released position; a roller carried and operated by the turnstile as the turnstile moves from one normal position to the next to engage and move the lever from released position to the first position; an electromagnet; an armature attracted by the magnet and having escapement means adapted when the magnet is energized and then deenergized to release the lever from first to normal position, or from normal to released position; a lever operated switch comprising spring contacts inherently biased to open position and closed by the escapement lever except when the lever is released by said escapement means; a turnstile operated switch comprising spring contacts biased to open position and engaged and closed by the turnstile when in normal position; and conductors connecting said dispenser, switches and the coil of said electro-magnet in series.

22. In combination, a check dispenser comprising means for projecting a check, and operating means adapted when a check is removed from the dispenser to project a new check, and having conductors adapted to transmit operating current until a new check is projected; a turnstile having arms; a disk coaxial with and fast on the turnstile and having peripheral lugs, and rollers between each pair of lugs; a support; a latch pivoted on the support and having a hooked end normally engaged with a lug to prevent forward movement of the turnstile; a spring urging the latch to unlatching position; an escapement lever intermediately fulcrumed on said support and movable to a released position nearest the disk, a first position most remote from the disk, an intermediate position adjacent to the first position, and a normal position between the intermediate and released positions; an extension on the fulcrumed end of the lever engageable with said latch said lever engaging the latch in and holding in latched position, except the lever is in released position; a spring for urging the lever toward the axis of the turnstile said lever having a cam edge normally disengaged by said rollers, and shaped to be engaged by a roller as the turnstile moves from one normal position to the next to move the lever from released position to the first position; said lever being provided near its free end with a pair of outer and inner escapement teeth pointing toward the fulcrum and with a single tooth pointing toward the space between an electro-magnet; an armature pivoted on said support and adapted to be attracted by said electro-magnet and having on its free end oppositely pointed projections respectively engageable with said single tooth and said pair; a spring to retract said armature; a lug operated switch comprising a substantially stationary contact and a spring contact adapted to move itself from the stationary contact and engageable by an adjacent lug in normal position; a source of current; and conductors connecting said conductors of the dispenser, the coil of said electro-magnet, said lever operated switch and said lug operated switch in series between the terminals of said source.

23. In combination, a check dispenser adapted to project a check and adaptive when a check is removed therefrom, to transmit electric current until a new check is presented; a turnstile having arms; a disk coaxial with and fast on the turnstile and having a peripheral lug adjacent to each arm, and a roller on the face of the disk about midway between each pair of arms; a support under the disk; a latch pivoted on the support and having a hooked end normally engaged with a lug to prevent forward movement of the turnstile; a spring tensioned between the lug and support urging the latch to unlatching position; an escapement lever intermediately fulcrumed on said support in the plane of revolution of the rollers and movable to a released position nearest the disk, a first position most remote from the disk, an intermediate position adjacent to the first position, and a normal position between the intermediate and released positions; an extension on the fulcrumed end of the lever engageable with said latch to hold the latch in holding engagement with the lug while the lever is in said positions except the released position; a spring tensioned between the support and said extension for urging the lever toward the axis of the disk; said lever having a cam edge normally disengaged by said rollers and shaped to be engaged by a roller as the turnstile moves from one normal position to the next to move the lever quickly from released position to normal position and then slowly to the first position; said rollers, as the turnstile moves from one position to the next, engaging said cam edge to move the lever from released position to the first position; an electric escapement means adapted to engage and hold the lever in said first position, and when energized and then deenergized to release the lever from first to normal position, or from normal to released position; a lever operated switch inherently biased to open position and closed by said lever except when the lever is in released position; a turnstile operated switch inherently engaged to open position and engaged and closed by one of the lugs when the turnstile is in normal position; and conductors connecting said dispenser, switches and electric escapement means in series.

24. In combination, a check dispenser adapted to project a check and adapted when a check is removed therefrom, to present a new check and to transmit current until the new check is presented; a turnstile carrying a disk carrying lugs; a support; a lever fulcrumed on the support and having a released position, a first position, and a normal position between the other positions; means for urging the lever toward released position; latch means operated by the lever for holding the turnstile latched except when the lever is in released position; means operated by the turnstile as the turnstile moves from one position to the next to move the lever from released position to the first position; said lever being provided near its free end with a pair of outer and inner escapement teeth in the plane of movement of the lever about equal distances from and pointing toward the fulcrum and with a single tooth in said plane pointing toward the space between said pair; an electro-magnet on said support; an armature pivoted on said support and adapted to be attracted by said electro-magnet and having its free end disposable between said pair and said single tooth and carrying oppositely pointed inner and outer projections respectively engageable with said single tooth and said pair; a spring to retract said armature; a lever operating switch urged to open position and engaged and closed by the lever except when the lever is released; a lug-operated switch comprising a substantially stationary contact and a spring contact adapted to move itself from the stationary contact and engageable by an adjacent lug in normal position to close the switch; a source of current; and conductors connecting said dispenser, the coil of said electro-magnet, said lever operated switch and said lug operated switch in series between the terminals of said source.

25. In combination, a check controlled switch having a spring for closing the switch; a motor and means driven thereby to feed strip through the switch, thus opening the switch, and to cut off the strip below the switch; a turnstile having arms; a turnstile disk coaxial with and fast on the turnstile and having peripheral lugs between adjacent arms; an intermediately fulcrumed latch having a forward end disposed in the direction of forward rotation of the turnstile and provided with a hook to engage and hold a lug, and adapted when the latch is locked to disengage the lug; the other end of the latch being extended and engaging the disk when the hook has just disengaged the lug; an electro-magnet adapted to attract the hook and release the lug; a control disk rotated by the motor and provided with a peripheral notch; a double throw switch comprising a normally engaged contact near the disk, a normally disengaged contact nearer the disk, and a movable contact between the other contacts and provided with a projection adapted to engage a lug in normal position to hold the movable contact against the normally engaged contact, said movable contact being inherently urged to the normally disengaged contact when the lug is moved from the switch; a normally open switch having a projection engaged in said notch and engageable with the periphery of the control disk when rotated to close the switch; a normally closed switch having a projection engaged by the periphery of the disk to hold the switch closed and engageable in the notch soon after the notch leaves the normally open switch when the control disk rotates, to allow the switch to open; a motor relay; a circuit closed by the relay when its magnet is energized to operate the motor; a source of current having one terminal connected to one end of the relay magnet coil, the other end of the coil being connected to said normally open switch; the other element of the normally open switch being connected to said movable contact and one element of the normally closed switch; the other element of the normally closed switch and said normally engaged contact being connected to the other terminal of said source.

26. In combination, a check dispenser adapted when a check is removed therefrom, to present a new check and to transmit current until said new check is presented; a turnstile having arms; a disk coaxial with and fast on the turnstile and having a peripheral lug adjacent to each arm; an escapement lever having a released position, a first position, and a normal position between the other positions; a spring engaging the latter urging the lever toward released position; a support; latch means pivoted on said support and engaged by and engaging said lugs and engaged and operated by the lever for holding the turnstile latched except when the lever is in released position; a roller carried and operated by the turnstile as the turnstile moves from one normal position to the next to engage and move the lever from released position to the first position; an electromagnet; an armature attracted by the magnet and having escapement means adapted when the magnet is energized and then deenergized to release the lever from first to normal position, or from normal to released position; a lever operated switch comprising spring contacts inherently biased to open position and closed by said escapement lever except when the lever is released by said escapement means; a turnstile operated switch comprising spring contacts biased to open position and engaged and closed by the turnstile when in normal position; and conductors connecting said dispenser, switches and the coil of said electro-magnet in series.

HOWARD M. KILPATRICK.

REFERENCES CITED

The following references are of record in the file of this patent:

UNITED STATES PATENTS

| Number | Name | Date |
|---|---|---|
| 1,293,974 | Sullivan | Feb. 11, 1919 |
| 1,841,132 | Kennedy et al. | Jan. 12, 1932 |
| 2,204,897 | Kilpatrick | June 18, 1940 |
| 2,312,340 | Kilpatrick | Mar. 2, 1943 |